May 1, 1951 L. R. HESSE 2,551,127
SPINNER FOR ARTIFICIAL FISH BAITS
Filed June 9, 1947

Inventor
Louis R. Hesse

By W. S. McDowell
Attorney

Patented May 1, 1951

2,551,127

UNITED STATES PATENT OFFICE 2,551,127

SPINNER FOR ARTIFICIAL FISH BAITS

Louis R. Hesse, Columbus, Ohio

Application June 9, 1947, Serial No. 753,413

1 Claim. (Cl. 43—42.2)

My invention relates to artificial fishing lures, and more specifically to spinners for artificial fishing lures of the type adapted for rotation about a spindle or link rod carried by the lure body.

It is an object of my invention to provide a spinner for artificial lures which is formed from an integral blank, and which provides a pair of oppositely extending wings, one of which is adapted to impart rotation to the spinner body, and the other of which is adapted to impart or create a turbulence within the water as the lure is being drawn forwardly through the water.

It is another object of my invention to provide a spinner of the character described, which may be formed in an economical manner from a single integral blank of sheet metal or synthetic resin, and which possesses characteristics capable of imparting novel movement to the associated artificial fishing lure.

These and additional objects and advantages of the present invention will become more readily apparent with reference to the following description and the accompanying drawing wherein.

Figure 1:
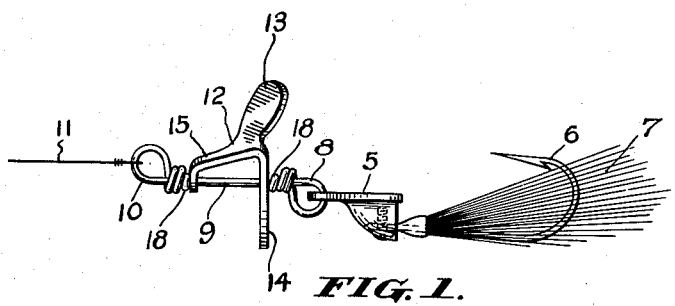
Fig. 1 is a side elevational view of an artificial fishing lure embodying a spinner formed in accordance with the present invention.

Referring now to the drawings, the numeral 5 designates a fishing lure body, which may be of any suitable size or shape, and to which is attached a rearwardly extending fish hook 6 protected in the usual manner by a buck tail 7 or other suitable camouflage. Connected with the forward end of the lure body 5, by means of a hook eye 8, is a link rod or spindle 9 which is formed at its opposite end with a second hook eye 10 adapted for connection with the end of a fishing line 11, or a swivel carried thereby. It will here be understood, that the link rod or spindle 9 may be of any suitable type which possesses an intermediate straight portion upon which a spinner body, to be hereinafter more fully described, may be attached for rotation thereon, and may be provided at its outer ends with swivel devices of the type well known in the art.

Figure 2:
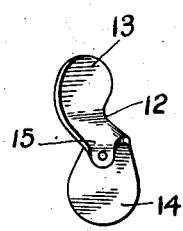
Fig. 2 is a front elevational view of the spinner.
Figure 3:
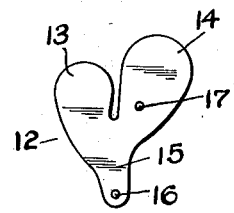
Fig. 3 is a front elevational view of the blank from which the spinner is formed prior to bending operations.
Figure 4:
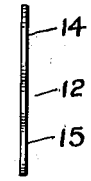
Fig. 4 is an end elevational view of the blank disclosed in Fig. 3.

Mounted upon the intermediate straight portion of the spindle 9 for rotation about the longitudinal axis thereof, is a spinner body, generally indicated by the numeral 12. This body, as shown particularly in Figs. 1 and 2 of the drawings, is formed from a single integral blank which is shown in Figures 3 and 4 and shaped to provide a pair of oppositely disposed wings 13 and 14 respectively, and an intermediate forwardly directed extension 15. The forward end of the extension 15 is formed with a bearing opening 16 which is adapted for the reception of the spindle shaft 9, and likewise a similar bearing opening 17 is provided in the wing 14. The spinner body after being stamped or otherwise suitably cut to its desired shape, is bent to a configuration as shown in Figs. 1 and 2 of the drawings, to provide the curved and angularly disposed propelling wing 13 which radiates outwardly from the rear portion of the extension 15 in acute angular relation to the axis of the spindle 9, and the flat plate-like turbulence-creating wing 14 which also radiates outwardly from the rear end of the extension in the opposite direction from the wing 13, and which, for the major portion of its length, extends on the opposite side of the axis of the spindle. The forward end of the extension 15, containing the bearing opening 16, is bent downwardly, in the same direction as the turbulence-creating wing 14, to a position in longitudinal alignment with the bearing opening 17 formed in the wing 14, at which time the spinner body may be positioned for rotation upon the straight intermediate portion of the spindle 9. The wing 14 in this position has its front and rear faces disposed at a right angle with respect to the axis of the spindle and presents a flat plate-like surface to a body of water as the lure is drawn forwardly therethrough, and as such, creates a turbulence within the water tending to cause oscillation or irregular swinging movement within the lure as the water is spilled to either side of the wing. At the same time, the wing 13 due to its angular disposition with respect to the longitudinal axis of the shaft or spindle 9, and also its acute angularity with respect to the plane of rotation of the wing 14, acts as a propelling wing for the spinner body, and causes the same to rotate about the shaft 9 as the lure is drawn forwardly through the water. To prevent binding of the spinner body with respect to the spindle 9, a pair of anti-friction rings 18 are interposed between the outer ends of the spinner and the inner ends of the hook eyes 8 and 10 to reduce any frictional drag between these members.

In view of the foregoing, it will be seen that as the spinner is drawn forwardly through the water in conjunction with the lure, the same will rotate about the longitudinal axis of the spindle 9, as a result of the curved angularity of the propelling wing 13. At the same time rotation is imparted to the flat plate-like wing 14, and as water strikes the forward face thereof a turbulence is created within the water, and due to the resistance of the wing 14, the entire lure will be caused to oscillate in an irregular pattern. The disturbance created by the turbulence in the water is advantageous, in that, it is likely to attract fish located at relatively great distances from the lure. If desired, the opposite blades of the spinner may be of different colors, or may have a relatively high reflecting surface in order to increase the effectiveness of the device as a fish-attracting lure. The present invention is characterized by its economy of manufacture, due to its one piece construction, which may be easily stamped from a single blank of sheet metal or one of the commonly known plastics of the type which lends itself to the subsequent bending operation.

While a preferred embodiment of my invention has been disclosed in detail, it will be understood that various modifications as to design and details of construction may be accomplished without departing from the spirit of the invention or the scope of the following claim.

I claim:

In a fishing lure; an elongated line-carried spindle; and a spinner body mounted for rotation on said spindle about its longitudinal axis, said spinner body comprising an integral blank formed with a pair of oppositely disposed spinner wings and a forwardly directed extension from said wings, said extension having at its forward end a bearing opening through which said spindle passes, one of said spinner wings radiating outwardly from the rear portion of said extension and in acute angular relation to the axis of the spindle, and the other of said spinner wings being flat and radiating outwardly from the rear end of said extension with its front and rear faces disposed at a right angle with respect to the axis of the spindle and extending for the major portion of its length on the opposite side of said axis from the first mentioned spinner wing, said other spinner wing being provided with a bearing opening in spaced longitudinal alignment with the bearing opening in said forwardly directed extension.

LOUIS R. HESSE.

REFERENCES CITED

The following references are of record in the file of this patent:

UNITED STATES PATENTS

| Number | Name | Date |
|---|---|---|
| 536,185 | Cook | Mar. 26, 1895 |
| 1,534,722 | Leberman et al. | Apr. 21, 1925 |
| 1,836,650 | Davenport | Dec. 15, 1931 |
| 1,855,365 | Schilpp | Apr. 26, 1932 |
| 2,086,008 | Turner | July 6, 1937 |
| 2,219,225 | Gambill | Oct. 22, 1940 |